United States Patent
Na et al.

(10) Patent No.: US 7,916,225 B2
(45) Date of Patent: Mar. 29, 2011

(54) LIQUID CRYSTAL DISPLAY FORMING A COUPLING CAPACITOR BETWEEN A PROXIMATE AND PARALLEL PORTION OF A DRAIN ELECTRODE AND A DATA LINE

(75) Inventors: Hye-Seok Na, Seoul (KR); Sung-Jae Moon, Seoul (KR); Back-Won Lee, Cheonan-si (KR); Seoung-Young Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 645 days.

(21) Appl. No.: 11/834,235

(22) Filed: Aug. 6, 2007

(65) Prior Publication Data

US 2008/0036933 A1 Feb. 14, 2008

(30) Foreign Application Priority Data

Aug. 9, 2006 (KR) ........................ 10-2006-0075293

(51) Int. Cl.
*G02F 1/136* (2006.01)
*G02F 1/141* (2006.01)
*G02F 1/1333* (2006.01)
*G02F 1/1343* (2006.01)
*G09G 3/36* (2006.01)
*G09G 3/18* (2006.01)

(52) U.S. Cl. .............. 349/38; 349/37; 349/48; 349/144; 349/146; 345/54

(58) Field of Classification Search ............... 349/48, 349/38, 144, 145, 146, 37; 345/54
See application file for complete search history.

(56) References Cited

U.S. PATENT DOCUMENTS

2006/0028590 A1* 2/2006 Shin et al. ................... 349/38
2006/0164352 A1* 7/2006 Yoo et al. .................... 345/87

(Continued)

FOREIGN PATENT DOCUMENTS

CN 1811535 8/2006

(Continued)

OTHER PUBLICATIONS

Hitachi LTD., May 21, 2003, Machine Translation of JP Pub 2003-149964 from Patent Abstracts of Japan Website, pp. 1-23.*

(Continued)

*Primary Examiner* — Mark A Robinson
*Assistant Examiner* — Dennis Y Kim
(74) *Attorney, Agent, or Firm* — H.C. Park & Associates, PLC

(57) ABSTRACT

Provided is a liquid crystal display (LCD) with enhanced display qualities. The LCD includes a first insulating substrate; a gate line disposed on the first insulating substrate and extending in a first direction; first and second data lines insulated from and crossing the gate line, separated from each other, and extending in a second direction; first and second thin film transistors (TFTs) connected to the gate line and the first and second data lines, respectively; first and second subpixel electrodes connected to the first and second TFTs, respectively; and first and second drain electrode connection portions connecting the first and second TFTs to the first and second subpixel electrodes, respectively. The first and second drain electrode connection portions are electrically insulated from each other and together form a substantially rectangular band.

15 Claims, 8 Drawing Sheets

U.S. PATENT DOCUMENTS

2006/0203172 A1* 9/2006 Baek et al. .................. 349/146
2008/0074601 A1* 3/2008 Lee et al. .................... 349/144
2008/0204613 A1* 8/2008 Kim et al. ..................... 349/33

FOREIGN PATENT DOCUMENTS

JP  2003149664  5/2003

OTHER PUBLICATIONS

Chinese Office Action dated Mar. 8, 2010 in corresponding Chinese Patent Application No. 200710140309.0.
The State Intellectual Property Office of P.R. China Office Action issued Sep. 26, 2010.

* cited by examiner

LIQUID CRYSTAL DISPLAY FORMING A COUPLING CAPACITOR BETWEEN A PROXIMATE AND PARALLEL PORTION OF A DRAIN ELECTRODE AND A DATA LINE

CROSS-REFERENCE TO RELATED APPLICATION

This application claims priority from and the benefit of Korean Patent Application No. 10-2006-0075293, filed on Aug. 9, 2006, which is incorporated herein by reference for all purposes as if fully set forth herein.

BACKGROUND OF THE INVENTION

1. Field of the Invention

The present invention relates to a display, and more particularly, to a liquid crystal display (LCD).

2. Discussion of the Background

Liquid crystal displays (LCDs) are one of the most widely used types of flat panel displays. Generally, an LCD includes a pair of display panels having electric field generating electrodes, such as pixel electrodes and common electrodes, and a liquid crystal layer interposed between the display panels. In an LCD, voltages are applied to electric field generating electrodes to generate an electric field. Accordingly, the alignment of liquid crystal molecules of a liquid crystal layer is determined, and polarization of incident light is controlled. As a result, a desired image is displayed on the LCD.

In a vertical alignment (VA) mode LCD, liquid crystal molecules are arranged with the long axes of the molecules being perpendicular to the upper and lower display panels when no electric field is applied to the liquid crystal molecules. VA mode LCDs are popular due to their high contrast ratios and wide standard viewing angles. The standard viewing angle denotes a viewing angle with a contrast ratio of 1:10 or a critical angle of luminance conversion between grayscales.

In order to widen a standard viewing angle of a VA mode LCD, cutouts may be formed in electric field generating electrodes or protrusions may be formed on the electric field generating electrodes. The cutouts or protrusions can determine the directions in which the liquid crystal molecules tilt. By using cutouts or protrusions to control the orientation of the liquid crystal molecules, the standard viewing angle of the VA mode LCD can be increased.

However, a drawback of the VA mode LCD is that it may have poor lateral visibility compared to frontal visibility. For example, in a patterned vertical alignment (PVA) mode LCD having cutouts, images are brighter near the sides of the screen than in the center of the screen. In extreme cases, the luminance difference between high grayscales may disappear, causing the images to become very dull.

To overcome this drawback, each pixel may be partitioned into two subpixels, and a switching device is formed in each subpixel. Then, a different voltage is applied to each subpixel. In other words, different data voltages are applied to a pair of subpixels so that a pixel composed of the subpixels can express the desired luminance. In particular, if an LCD operates at a low gray voltage, it is actually driven by a subpixel to which a relatively high data voltage is applied. Therefore, coupling capacitances between a subpixel, to which a relatively high voltage is applied, and a pair of data lines on opposite sides of the subpixel should be matched in order to enhance display quality of the LCD.

SUMMARY OF THE INVENTION

The present invention provides a liquid crystal display (LCD) that may have enhanced display quality.

Additional features of the invention will be set forth in the description which follows, and in part will be apparent from the description, or may be learned by practice of the invention.

The present invention discloses an LCD including a first insulating substrate; a gate line disposed on the first insulating substrate and extending in a first direction; and first and second data lines insulated from and crossing the gate line, separated from each other, and extending in a second direction. The LCD further includes a first thin film transistor (TFT) and a second TFT connected to the gate line and the first data line and the second data line, respectively; a first subpixel electrode and a second subpixel electrodes connected to the first TFT and the second TFT, respectively; and a first drain electrode connection portion and a second drain electrode connection portion connecting the first TFT and the second TFT to the first subpixel electrode and the second subpixel electrode, respectively. The first drain electrode connection portion and the second drain electrode connection portion are electrically insulated from each other and together form a substantially rectangular band.

The present invention also discloses an LCD including a first insulating substrate; gate lines disposed on the first insulating substrate and extending in a first direction; first data lines and second data lines insulated from and crossing the gate lines, separated from each other, and extending in a second direction; and a plurality of pixels. The plurality of pixels are defined by the crossing of the gate lines and the data lines and each include a first TFT and a second TFT connected to a gate line and a first data line and a second data line, respectively; a first subpixel electrode having a V shape disposed in a region of the pixel, wherein the bottom portion of the V is adjacent to the second data line; a second subpixel electrode disposed in a remaining region of the pixel; and a drain electrode connection portion in the form of a substantially rectangular band, connecting the first TFT or the second TFT to the first subpixel electrode or second subpixel electrode. A pixel of a first type having the first subpixel electrode connected to the first data line and a pixel of a second type having the first subpixel electrode connected to the second data line may be alternately arranged in the first and second directions. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
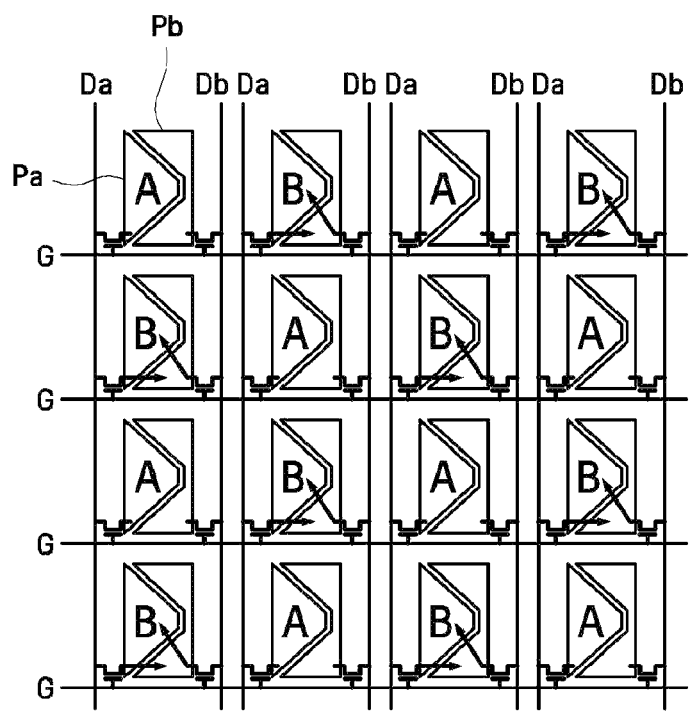
FIG. 1 is a schematic diagram showing a pixel array of a liquid crystal display (LCD) according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

A liquid crystal display (LCD) according to an exemplary embodiment of the present invention will hereinafter be described in detail with reference to the accompanying drawings.

Figure 2:
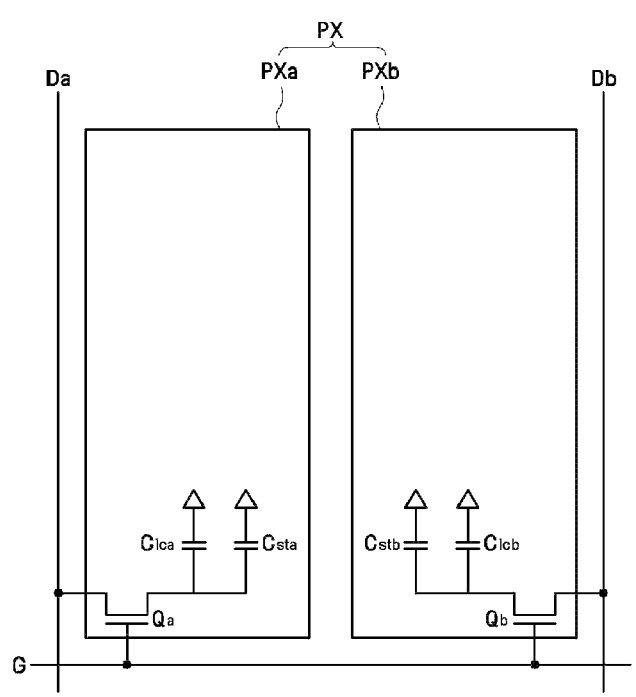
FIG. 2 is an equivalent circuit diagram of a pixel included in the LCD of FIG. 1.

FIG. 1 is a schematic diagram showing a pixel array of an LCD according to an exemplary embodiment of the present invention. FIG. 2 is an equivalent circuit diagram of a pixel included in the LCD of FIG. 1.

The LCD according to the present embodiment includes a liquid crystal panel assembly, a gate driver and a data driver connected to the liquid crystal panel assembly, a gray voltage generator connected to the data driver, and a signal controller controlling the gate driver and the data driver.

The liquid crystal panel assembly includes a plurality of display signal lines and a plurality of pixels PX, which are connected to the display signal lines and arranged substantially in a matrix. The liquid crystal panel assembly also includes lower and upper display panels facing each other and a liquid crystal layer interposed between the lower and upper display panels.

Referring to FIG. 1 and FIG. 2, the display signal lines are formed on the lower display panel. The display signal lines include a plurality of gate lines G for transmitting gate signals and a plurality of first and second data lines Da and Db for transmitting data signals. The gate lines G extend substantially in a row direction and are substantially parallel to each other. The first and second data lines Da and Db extend substantially perpendicular to the gate lines and parallel to each other.

Each pixel PX includes a pair of subpixels PXa and PXb. Each subpixel PXa and PXb includes a switching device Qa or Qb connected to the first or second data line Da or Db and one gate line G, a liquid crystal capacitor Clca or Clcb connected to the switching device Qa or Qb, and optionally, a storage capacitor Csta or Cstb connected to the switching device Qa or Qb. In other words, two data lines Da and Db and one gate line G are allocated to a pair of subpixels PXa and PXb. The storage capacitor Csta and Cstb may be omitted when necessary.

The switching device Qa or Qb in each subpixel PXa and PXb may be a thin film transistor formed on the lower display panel. Specifically, the switching device Qa or Qb may be a three-terminal device that includes a control terminal (hereinafter, referred to as a gate electrode) connected to the gate line G to which a gate signal is transmitted, an input terminal (hereinafter, referred to as a source electrode) connected to the first or second data line Da or Db, and an output terminal (hereinafter, referred to as a drain electrode) connected to the liquid crystal capacitor Clca or Clcb and the storage capacitor Csta or Cstb.

The liquid crystal capacitor Clca or Clcb uses a first or second subpixel electrode Pa or Pb in the lower display panel and a common electrode in the upper display panel as two terminals. The liquid crystal layer between the first or second subpixel electrode Pa or Pb and the common electrode functions as a dielectric. The first and second subpixel electrodes Pa and Pb are connected to switching devices Qa and Qb, respectively. The common electrode is formed on a front surface of the upper display panel, and a common voltage Vcom is applied to the common electrode. The common electrode may alternatively be formed on the lower display panel. In this case, at least one of the first and second subpixel electrodes Pa and Pb and the common electrode may be linear or bar-shaped.

The storage capacitors Csta and Cstb supplement the liquid crystal capacitors Clca and Clcb. Each storage capacitor Csta and Cstb may be composed of a storage wiring and one of the first or second subpixel electrodes Pa or Pb, which are formed on the lower display panel and overlap each other with an insulator therebetween. A predetermined voltage, such as the common voltage Vcom, is applied to the storage wiring. Each storage capacitor Csta and Cstb may be formed of a previous gate line and the first or second subpixel electrode Pa or Pb on the previous gate line using the insulator as a medium.

Each pixel PX may display one of three primary colors (spatial division) or alternatively, may display the three primary colors at different times (time division) so that a spatio-temporal sum of the three primary colors can produce a desired color which can be recognized. The three primary colors may be red (R), green (G) and blue (B). As an example of spatial division, each pixel PX may include a color filter representing one of the three primary colors in a region of the upper display panel. In addition, the color filter may be formed on or under the first and second subpixel electrodes Pa and Pb of the lower display panel.

The gate driver is connected to the gate lines G and transmits a gate signal, i.e. a gate on voltage Von or a gate off voltage Voff, to the gate lines G.

The gray voltage generator may generate two sets of gray voltages (or reference gray voltages) to be transmitted to the pixels and apply the generated sets of gray voltages to the data driver. In other words, the two sets of the gray voltages may be independently applied to each pair of subpixels that form each pixel. However, the present invention is not limited thereto. The gray voltage generator may generate only one set of gray voltages.

The data driver is connected to each of a pair of the first and second data lines Da and Db. The data driver applies a data voltage to any one of a pair of the subpixels Pa and Pb that form each pixel PX through the first data line Da and applies a different data voltage to the other one of the subpixels Pa and Pb through the second data line Db.

The gate driver or the data driver may be directly mounted on the liquid crystal panel assembly in the form of a plurality of driving integrated circuit (IC) chips or may be mounted on flexible printed circuit films and attached to the liquid panel assembly in the form of tape carrier packages. Otherwise, the gate driver or the data driver may be integrated into the liquid crystal panel assembly together with the display signal lines, i.e., the gate lines G and the first and second data lines Da and Db, and the switching devices Qa and Qb, i.e., the thin film transistors.

The signal controller controls the operations of the gate driver and the data driver.

Referring back to FIG. 1, each pixel PX includes two switching devices Qa and Qb and the first and second subpixel electrodes Pa and Pb are connected to the switching devices Qa and Qb, respectively. A relatively high data voltage may be applied to the first subpxiel electrode Pa and a relatively low data voltage may be applied to the second subpixel electrode Pb. Hereinafter, a high or low data voltage is referred to as a large or small difference between a common voltage and the data voltage, respectively. In addition, a pixel in which the data voltage is applied to the first subpixel electrode Pa through the first data line Da is referred to as a type A pixel, and a pixel in which the data voltage is applied to the first subpixel electrode Pa through the second data line Db is referred to as a type B pixel.

As illustrated in FIG. 1, type A pixels and type B pixels may be alternately arranged in horizontal and vertical directions to prevent a horizontal or vertical pattern from being seen on the LCD.

The data voltage may be applied to the first subpixel electrode Pa through the first data line Da for all pixels. That is, the pixel array may be composed of only type A pixels. In this case, if the LCD is driven by column inversion, the vertical pattern moving in the horizontal direction, with respect to a test pattern that moves in the horizontal direction by one pixel per frame, may be seen on the LCD.

In addition, the data voltage may be applied to the first subpixel electrode Pa through the first data line Da for one row of pixels, and the data voltage may be applied to the first subpixel electrode Pa through the second data line Db for another row of pixels. That is, rows of type A pixels and rows of type B pixels may be alternately arranged. This arrangement prevents the vertical pattern moving in the horizontal direction, as described above, from being seen on the LCD. The first subpixel electrode Pa is coupled to each of the first and second data lines Da and Db. As such, the horizontal pattern may be seen since a coupling capacitance of the first subpixel Pa and each of the first and second data lines Da and Db varies according to whether a pixel is a type A pixel or a type B pixel.

The vertical or horizontal pattern moving in the horizontal direction, described above, can be avoided by alternately arranging type A pixels and type B pixels in the horizontal and vertical directions, as in the LCD illustrated in FIG. 1. If an LCD with this arrangement operates at a low gray voltage, the LCD is actually driven by the first subpixel electrode Pa to which a relatively high voltage is applied. Hence, if the difference between the coupling capacitance of the first subpixel electrode Pa and the first data line Da and that of the first subpixel electrode Pa and the second data line Db is reduced for each of the type A and type B pixels, the deterioration of display quality of the LCD due to crosstalk may be prevented.

Hereinafter, an LCD according to an exemplary embodiment of the present invention will be described in detail with reference to FIG. 3, FIG. 4, FIG. 5, and FIG. 6. The LCD according to the present embodiment includes a lower display panel, an upper display panel facing the lower display panel, and a liquid crystal layer interposed between the lower and upper display panels.

Figure 3:
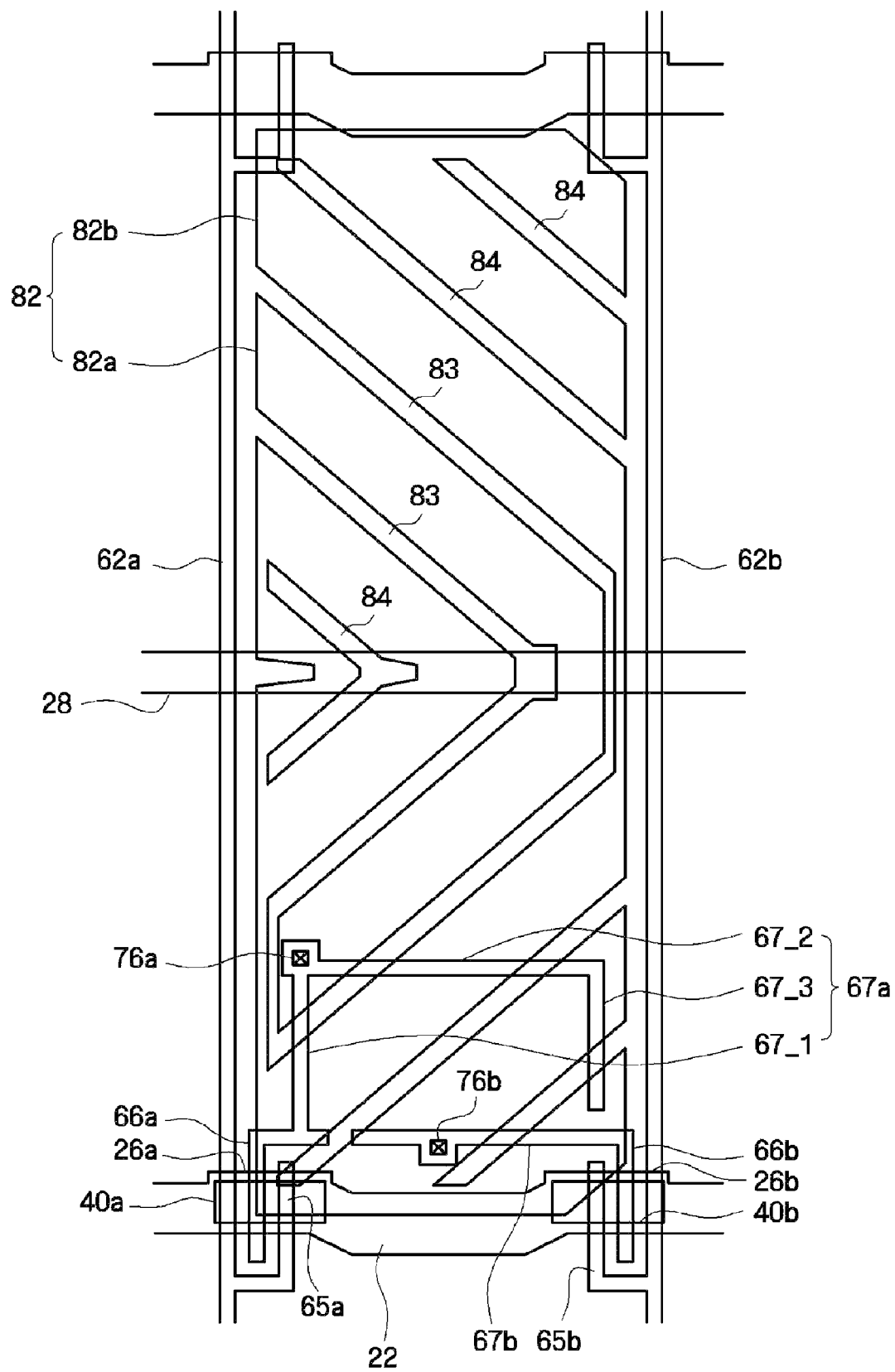
FIG. 3 is a layout diagram of a lower display panel including the type A pixels shown in FIG. 1.

The lower display panel of the LCD will now be described in detail with reference to FIG. 3. FIG. 3 is a layout diagram of the lower display panel including the type A pixels illustrated in FIG. 1.

Referring to FIG. 3, a gate line 22 and a storage wiring 28 are disposed on an insulating substrate which may be formed of, for example, transparent glass.

The gate line 22 generally extends in a horizontal direction and transmits a gate signal. The gate line 22 is connected to each pixel in the row. The gate line 22 includes a pair of first and second protruding gate electrodes 26a and 26b. The gate line 22 and the first and second gate electrodes 26a and 26b are referred to as gate wirings.

The storage wiring 28 generally extends in the horizontal direction and forms a storage capacitor together with the pixel electrode 82. In the present embodiment, the storage wiring 28 overlaps the center of the first subpixel electrode 82a. However, the present invention is not limited thereto. The shape and disposition of the storage wiring 28 may vary.

The gate wirings and the storage wiring 28 may be formed of aluminum (Al)-based metal, such as aluminum and an aluminum alloy, silver (Ag)-based metal, such as silver and a silver alloy, copper (Cu)-based metal such as copper and a copper alloy, molybdenum (Mo)-based metal, such as molybdenum and a molybdenum alloy, chrome (Cr), titanium (Ti) or tantalum (Ta).

In addition, the gate wirings and the storage wiring 28 may have a multi-film structure composed of two conductive films (not shown) with different physical characteristics. One of the two conductive films may be formed of metal with low resistivity, such as aluminum-based metal, silver-based metal or copper-based metal, in order to reduce a signal delay or a voltage drop of the gate wirings and the storage wiring 28. The other one of the conductive films may be formed of a different material, in particular, a material having superior contact characteristics with indium tin oxide (ITO) and indium zinc oxide (IZO), such as molybdenum-based metal, chrome, titanium, or tantalum. Examples of multi-film structures include a chrome lower film and an aluminum upper film and an aluminum lower film and a molybdenum upper film. However, the present invention is not limited thereto. The gate wirings and the storage wiring 28 may be formed of various metals and conductors.

A gate insulating film (not shown), which may be formed of silicon nitride (SiNx), may be disposed on the gate line 22 and the storage wiring 28.

A pair of semiconductor layers 40a and 40b, which are formed of hydrogenated amorphous silicon or polycrystalline silicon, may be disposed on the gate insulating film. The semiconductor layers 40a and 40b may have various shapes. For example, the semiconductor layers 40a and 40b may be islands or may be formed linearly. In the present embodiment, the semiconductor layers 40a and 40b are islands.

An ohmic contact layer (not shown) formed of a material, such as silicide or n+ hydrogenated amorphous silicon doped with n-type impurities in high concentration, may be disposed on each of the semiconductor layers 40a and 40b. That is, a pair of the ohmic contact layers may be formed on the semiconductor layers 40a and 40b.

A pair of first and second data lines 62a and 62b and a pair of first and second drain electrodes 66a and 66b, corresponding to the first and second data lines 62a and 62b, respectively, are formed on the ohmic contact layers and the gate insulating film.

The first and second data lines 62a and 62b generally extend in the vertical direction, crossing the gate line 22 and the storage wiring 28, and transmit the data voltages to the gate line 22 and the storage wiring 28. First and second source electrodes 65a and 65b branch from the first and second data lines 62a and 62b and extend toward the first and second drain electrodes 66a and 66b, respectively. As shown in FIG. 3, a pixel is partitioned into a pair of subpixels, and the first data line 62a transmits a data signal to one of the subpixels, and the second data line 62b transmits another data signal to the other one of the subpixels.

The first and second data lines 62a and 62b, the first and second source electrodes 65a and 65b, and the first and second drain electrodes 66a and 66b are referred to as data wirings.

The data wirings may be formed of chrome, molybdenum-based metal, or refractory metal such as tantalum and titanium. In addition, the data wirings may have a multi-film structure (not shown) composed of a lower film, which is formed of refractory metal, and an upper film, which is formed of a material with low resistivity and is disposed on the lower film. Examples of multi-film structures include a chrome lower film and an aluminum upper film and an aluminum lower film and a molybdenum upper film. Alternatively, the multi-film structure may be a three-film structure having molybdenum-aluminum-molybdenum films.

At least a portion of the first and second source electrodes 65a and 65b overlaps the semiconductor layers 40a and 40b, respectively. In addition, the first and second drain electrodes 66a and 66b respectively face the first and second source electrodes 65a and 65b with respect to the gate electrodes 26a and 26b, and at least a portion of the first and second drain electrodes 66a and 66b overlaps the semiconductor layers 40a and 40b, respectively. The ohmic contact layers described above may be arranged between the semiconductor layers 40a and 40b, which are disposed under the ohmic contact layers, and the first and second source electrodes 65a and 65b and the first and second data lines 62a and 62b, which are disposed on top of the ohmic contact layers. The ohmic contact layers reduce contact resistance.

A passivation layer (not shown) may be formed on the data wirings and exposed portions of the semiconductor layers 40a and 40b. The passivation layer may be formed of an inorganic material such as silicon nitride or silicon oxide, an organic material having photosensitivity and superior planarization characteristics, or a low-k dielectric material formed by plasma enhanced chemical vapor deposition (PECVD), such as a-Si:C:O or a-Si:O:F. The passivation layer may be composed of a lower inorganic layer and an upper organic layer in order to protect exposed portions of the semiconductor layers 40a and 40b while taking advantage of the superior characteristics of an organic layer.

First and second subpixel electrodes 82a and 82b may be formed on the passivation layer. The first and second subpixel electrodes 82a and 82b are connected to the first and second drain electrodes 66a and 66b by first and second contact holes 76a and 76b, respectively, and are located in pixel regions. The first and second subpixel electrodes 82a and 82b may be formed of transparent conductors, such as ITO or IZO, or reflective conductors such as aluminum.

As described above, the first and second subpixel electrodes 82a and 82b are connected to the first and second drain electrodes 66a and 66b by the first and second contact holes 76a and 76b, respectively. Therefore, the first and second subpixel electrodes 82a and 82b may be supplied with different data voltages from the first and second drain electrodes 66a and 66b.

The first and second subpixel electrodes 82a and 82b, to which the different data voltages are applied, generate an electric field together with a common electrode in the upper display panel, thereby determining the arrangement of liquid crystal molecules between the first and second subpixel electrodes 82a and 82b and the common electrode.

Each of the subpixel electrodes 82a and 82b and the common electrode form a liquid crystal capacitor Clca or Clcb and thus, sustain a voltage applied thereto even after a thin film transistor, i.e., a switching device Qa or Qb, is turned off. Storage capacitors Csta and Cstb may be connected, in parallel, to the liquid crystal capacitors Clca and Clcb to strengthen a voltage sustaining capability. Each of the storage capacitors Csta and Cstb is formed of an overlap of the storage wiring 28 with either the first or second subpixel electrode 82a or 82b, or the first or second drain electrode 66a or 66b connected to the first or second subpixel electrode 82a or 82b.

One pixel electrode 82 includes the first and second subpixel electrodes 82a and 82b, which engage with each other with predetermined gaps 83 therebetween. The first subpixel electrode 82a is disposed in a region of the pixel and is substantially shaped like a "V" lying laterally, and the second subpixel electrode 82b is disposed in the remaining region of the pixel.

The gaps 83 between the first and second subpixel electrodes 82a and 82b include oblique portions at an angle of approximately 45 or −45 degrees with respect to the gate line 22 and vertical portions connecting the oblique portions. Domain partition portions 84, such as cutouts or protrusions, are at an angle of approximately 45 or −45 degrees with respect to the gate line 22 and are formed in the second subpixel electrode 82b.

A display region of the pixel electrode 82 is partitioned into a plurality of domains according to a direction in which main directors of liquid crystal molecules included in the liquid crystal layer are arranged when an electric field is applied to the liquid crystal layer. The domain partition portions 84 partition the pixel electrode 82, for example, the second subpixel electrode 82b, into a plurality of domains. A domain denotes a region having molecules whose directors slant together in a certain direction due to an electric field formed between the pixel electrode 82 and the common electrode 90 (see FIG. 5).

A relatively high data voltage is applied to the first subpixel electrode 82a via the first data line 62a, and a relatively low data voltage is applied to the second subpixel electrode 82b via the second data line 62b. Consequently, the lateral visibility of the LCD may be enhanced.

An alignment film (not shown), which can align the liquid crystal layer, may be coated on the first and second subpixel electrodes 82a and 82b and the passivation layer.

If the LCD operates at a low gray voltage, the LCD is actually driven by the first subpixel electrode 82a to which a relatively high voltage is applied. Hence, if the difference between the coupling capacitance of the first subpixel electrode 82a and the first data line 62a and the coupling capacitance of the first subpixel electrode 82a and the second data line 62b is reduced, the deterioration of display quality of the LCD due to individual crosstalk of the first and second data lines 62a and 62b may be prevented.

Figure 4:
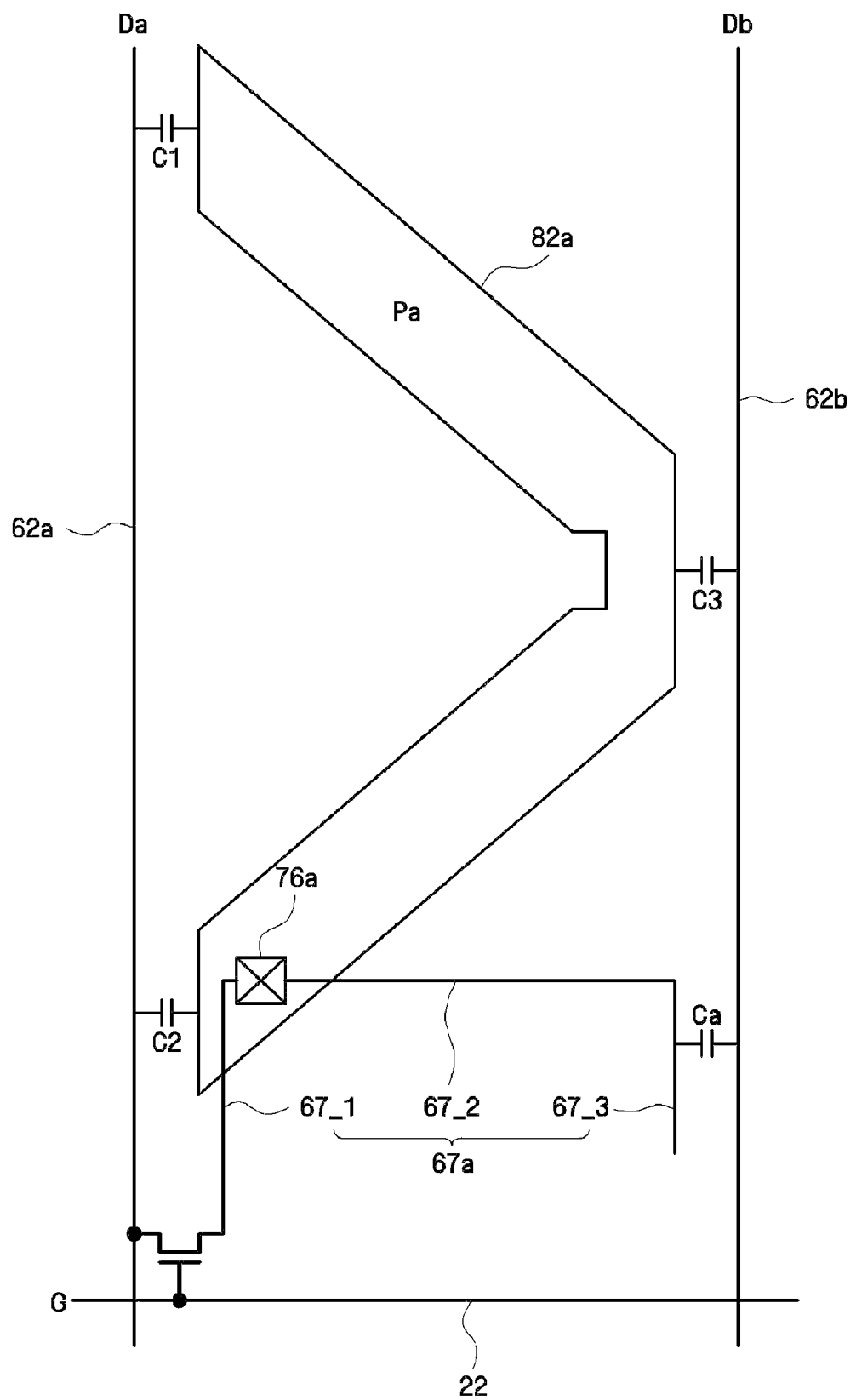
FIG. 4 is a schematic diagram showing the coupling relationship between the subpixel electrodes and the data lines shown in FIG. 3.

Hereinafter, the coupling capacitance between the first subpixel electrode 82a and each of the first and second data lines 62a and 62b will be described in detail with reference to FIG. 3 and FIG. 4. FIG. 4 is a schematic diagram showing the coupling relationship between the first subpixel electrode 82a and the first and second data lines 62a and 62b shown in FIG. 3.

Referring to FIG. 3 and FIG. 4, the first subpixel electrode 82a is substantially shaped like a "V" lying laterally. Two coupling capacitors C1 and C2 are formed in two regions where the first subpixel electrode 82a is adjacent to the first data line 62a. In addition, another coupling capacitor C3 is formed in a region where the first subpixel electrode 82a is adjacent to the second data line 62b. In other words, the first subpixel electrode 82a has a "V" shape and the bottom portion of the "V" is adjacent to the second data line 62b.

The first and second drain electrodes 66a and 66b are disposed on first and second gate electrodes 26a and 26b, respectively. First and second drain electrode connection portions 67a and 67b extend from the first and second drain electrodes 66a and 66b to the first and second contact holes 76a and 76b, respectively. The first and second drain connection portions 67a and 67b may be formed of substantially the same material and on the same layer as the data wirings.

The first and second drain electrode connection portions 67a and 67b are electrically insulated from each other and together form a substantially rectangular band. Specifically, the first drain electrode connection portion 67a includes a first pattern 67_1, which extends in a vertical direction and connects the first drain electrode 66a on the semiconductor layer 40a and the first contact hole 76a, a second pattern 67_2, which extends from the first pattern 67_1 in the horizontal direction, and a third pattern 67_3, which extends from the second pattern 67_2 and is parallel to the second data line 62b. The second drain electrode connection unit 67b extends in the horizontal direction and connects the second drain electrode 66b on the semiconductor layer 40b and the second contact hole 76b.

The coupling capacitors C1 and C2 are formed between the first subpixel electrode 82a and the first data line 62a, and the coupling capacitor C3 is formed between the first subpixel electrode 82a and the second data line 62b. The regions where the first subpixel electrode 82a is adjacent to the first data line 62a are relatively wider than the region where the first subpixel electrode 82a is adjacent to the second data line 62b. For example, the ratio of the width of the regions where the first subpixel electrode 82a is adjacent to the first data line 62a to the width of the region where the first subpixel electrode 82a is adjacent to the second data line 62b may be in the range of 1 to 2.5. In addition, the storage wiring 28 is formed under the region where the first subpixel electrode 82a is adjacent to the second data line 62b and obstructs coupling. Hence, the coupling capacitance of the coupling capacitors C1 and C2 formed between the first subpixel electrode 82a and the first data line 62a is relatively greater than that of the coupling capacitor C3 formed between the first subpixel electrode 82a and the second data line 62b.

Therefore, the third pattern 67_3, which is arranged parallel to the second data line 62b, is formed in the first drain electrode connection portion 67a in order to complement the coupling capacitance of the first subpixel electrode 82a and the second data line 62b. The third pattern 67_3 forms a coupling capacitor Ca with the second data line 62b. This allows for the difference in capacitance between the coupling capacitors C1 and C2, which are formed between the first subpixel electrode 82a and the first data line 62a, and the coupling capacitors C3 and Ca, which are formed between the first subpixel electrode 82a and the second data line 62b, to be reduced. The coupling capacitance of the coupling capacitor Ca may be adjusted by varying the length of the third pattern 67_3 and the distance between the third pattern 67_3 and the second data line 62b.

Figure 5:
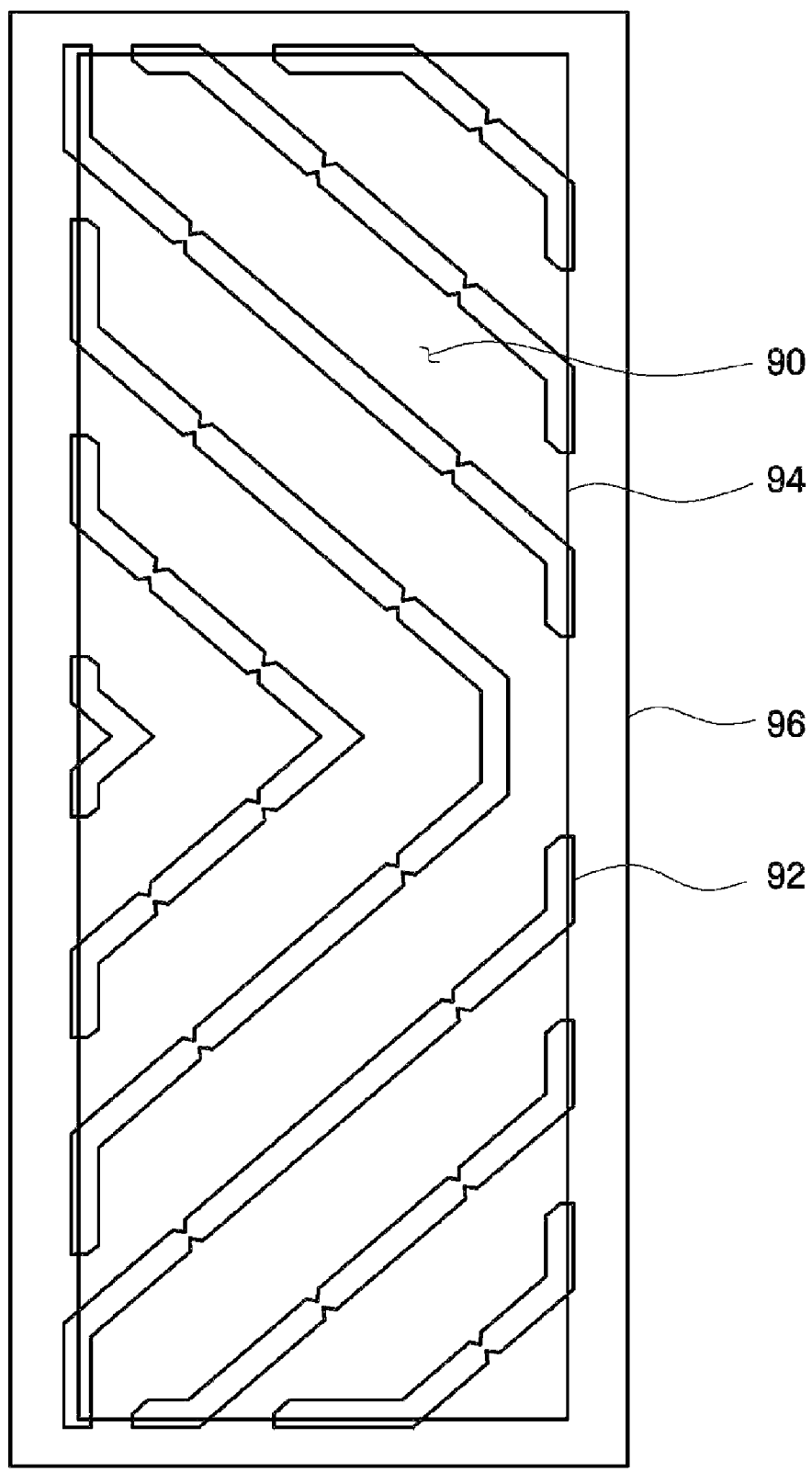
FIG. 5 is a layout diagram of an upper display panel coupled to the lower display panel shown in FIG. 3.
Figure 6:
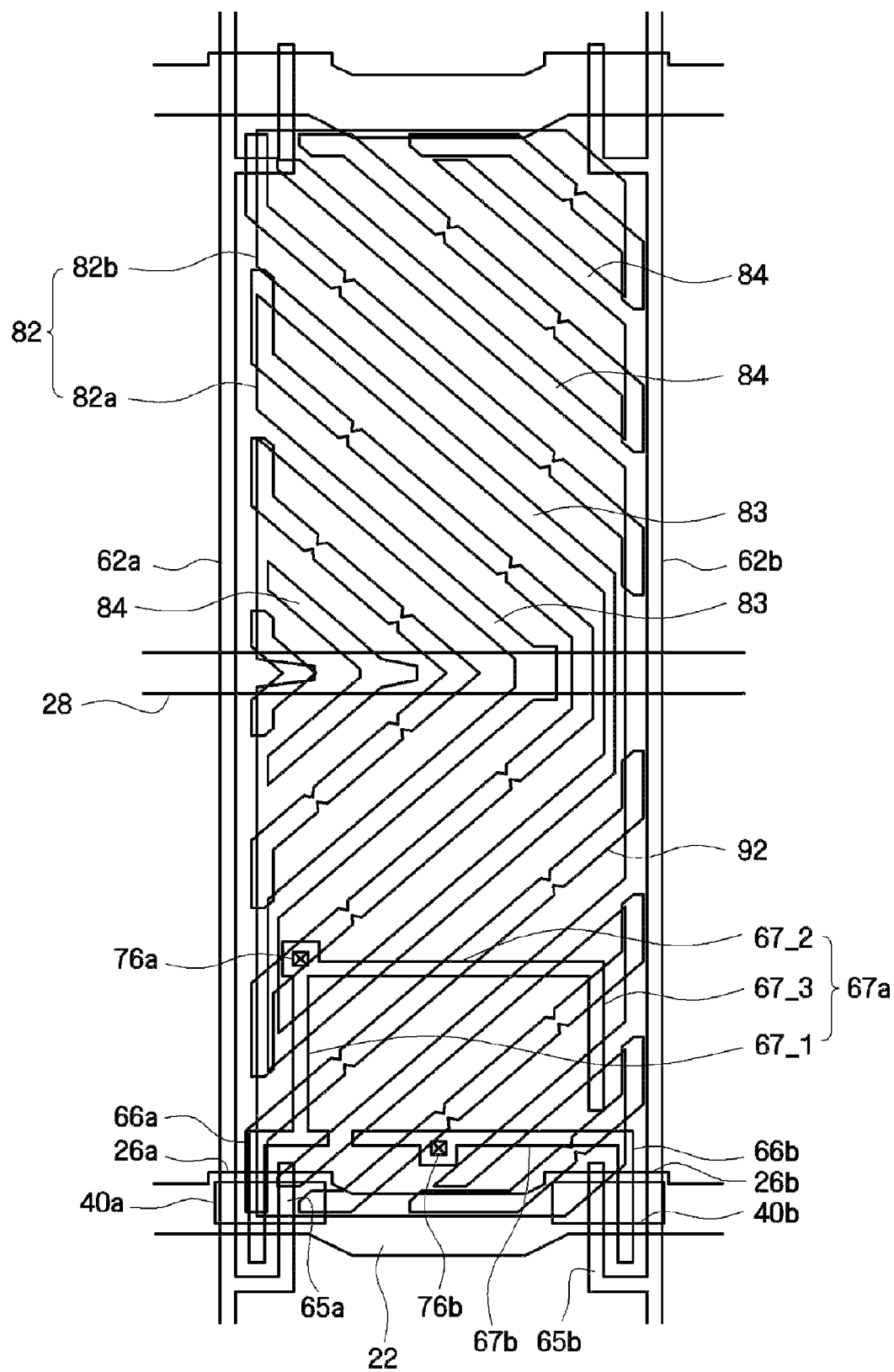
FIG. 6 is a layout diagram of the LCD including the lower display panel shown in FIG. 3 and the upper display panel shown in FIG. 5.

Hereinafter, the upper display panel and the LCD will be described with reference to FIG. 5 and FIG. 6. FIG. 5 is a layout diagram of the upper display panel that is coupled to the lower display panel shown in FIG. 3. FIG. 6 is a layout diagram of the LCD including the upper display panel shown in FIG. 5.

A black matrix 94 for preventing leakage of light, an RGB color filter 96, and the common electrode 90, which may be formed of a transparent conductive material, such as ITO or IZO, are disposed on an insulating substrate (not shown) which may be formed of transparent glass. Here, the black matrix 94 may be disposed in a region defined by a gate line 22, first and second data lines 62a and 62b, and a thin film transistor. In addition, the black matrix 94 may have various shapes in order to prevent the leakage of light in regions around the first and second subpixel electrodes 82a and 82b and the thin film transistor.

The common electrode 90, which faces the first and second subpixel electrodes 82a and 82b, includes domain partition portions 92, such as cutouts or protrusions, which are at an angle of approximately 45 or −45 degrees with respect to the gate line 22. Oblique portions of the domain partition portions 92, gaps 83 between the first and second subpixel electrodes 82a and 82b, and domain partition portions 84 in the second subpixel electrode 82b are alternately arranged.

An alignment film (not shown) aligning liquid crystal molecules may be coated on the common electrode 90.

If the lower and upper display panels structured as described above are aligned and coupled to each other, liquid crystal material may be injected between the panels to form the basic structure of the LCD. When the lower and upper display panels are aligned, the gaps 83 between the first and second subpixel electrodes 82a and 82b, the domain partition portions 84 in the second subpixel electrode 82b, and the domain partition portions 92 of the common electrode 90 partition a pixel region into a plurality of domains. Accordingly, the standard viewing angle of the LCD may be increased.

Figure 7:
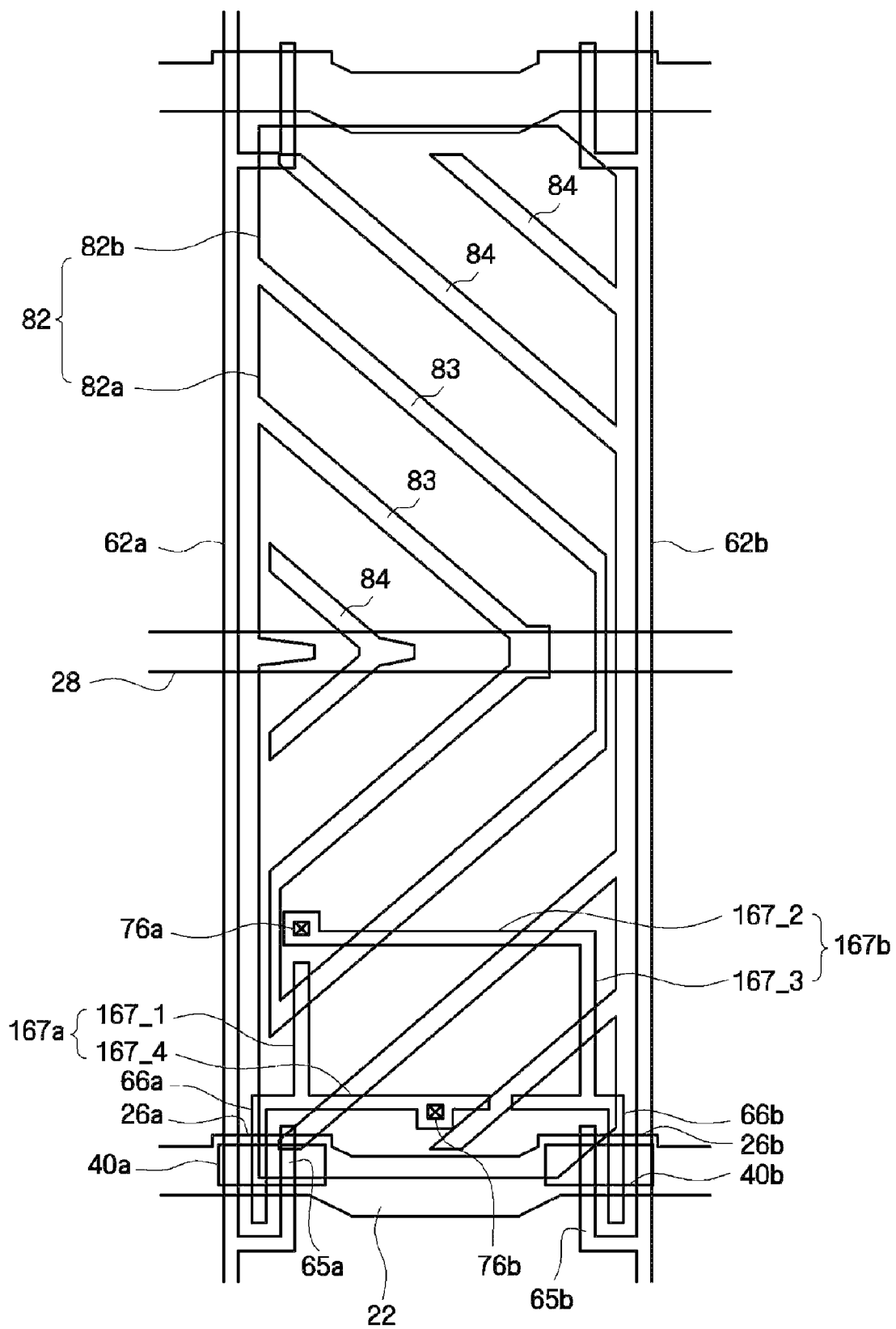
FIG. 7 is a layout diagram of a lower display panel including the type B pixels shown in FIG. 1.
Figure 8:
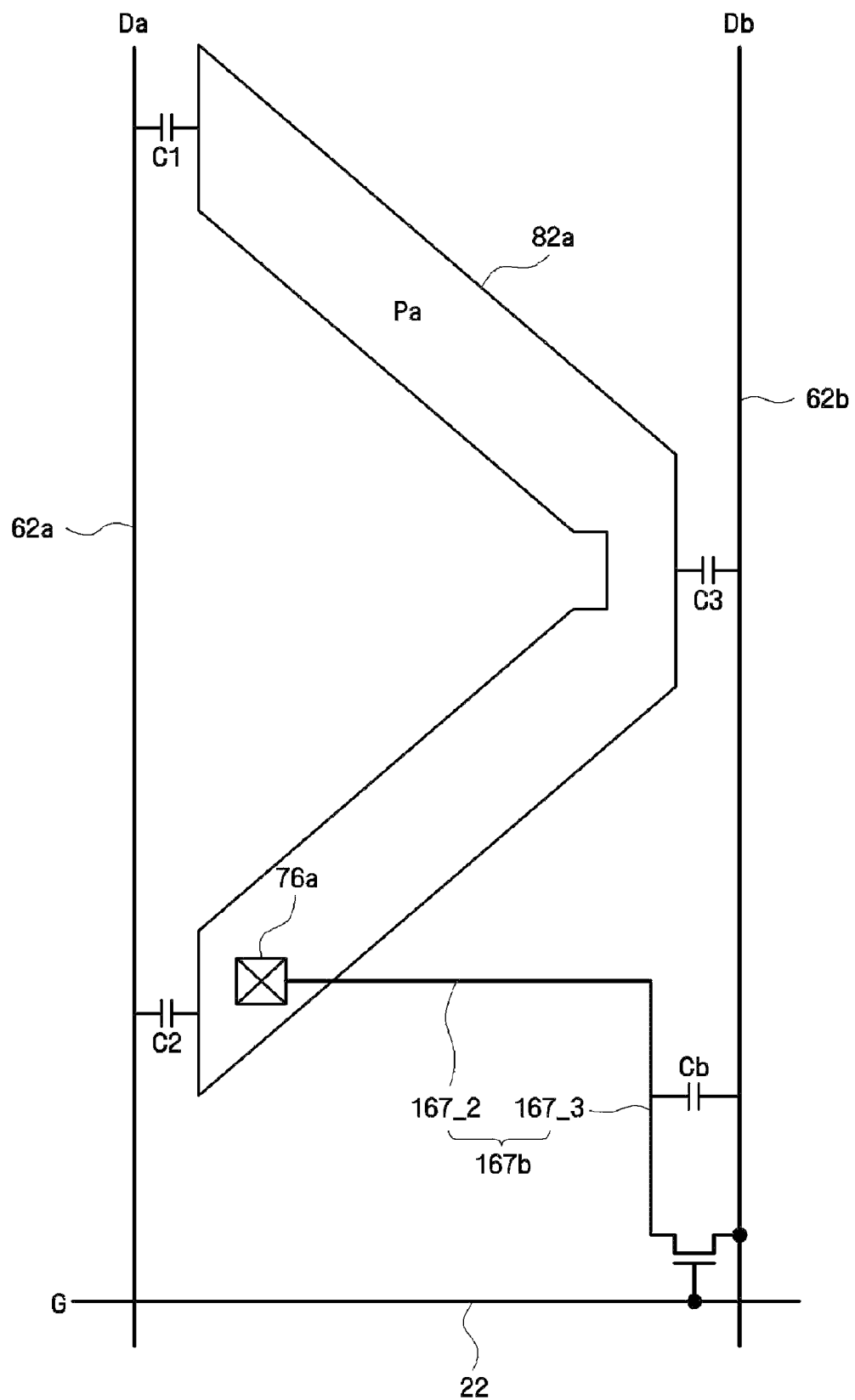
FIG. 8 is a schematic diagram showing the coupling relationship between the subpixel electrodes and the data lines shown in FIG. 7.

Hereinafter, an LCD according to another exemplary embodiment of the present invention will be described with reference to FIG. 7 and FIG. 8. FIG. 7 is a layout diagram of a lower display panel including the type B pixels of FIG. 1. FIG. 8 is a schematic diagram illustrating the coupling relationship between subpixel electrodes and data lines shown in FIG. 7. For convenience of description, elements having identical functions to those of the elements shown in FIG. 3, FIG. 4, FIG. 5, and FIG. 6 are indicated by the same reference numerals. Thus, a detailed description thereof will be omitted. The LCD according to the present embodiment has basically the same structure as the LCD according to the previous embodiment except for the following features.

As shown in FIG. 7 and FIG. 8, a first drain electrode 66a contacts a second subpixel electrode 82b through a first drain electrode connection portion 167a and a second contact hole 76b, and a second drain electrode 66b contacts a first subpixel electrode 82a through a second drain electrode connection portion 167b and a first contact hole 76a. The first and second drain electrode connection portions 167a and 167b and the data wirings (62a, 62b, 65a, 65b, 66a, and 66b) are formed of substantially the same materials on the same layer.

The first and second drain electrode connection portions 167a and 167b are electrically insulated from each other and together form a substantially rectangular band. Specifically, the first drain electrode connection portion 167a includes a first pattern 167_4, which extends in the horizontal direction and connects the first drain electrode 66a on the semiconductor layer 40a and the second contact hole 76b, and a second pattern 167_1, which extends from the first drain electrode 66a in the vertical direction. The second drain electrode connection unit 167b includes a first pattern 167_3, which extends from the second drain electrode 66b on the semiconductor layer 40b in the vertical direction and is arranged parallel to the second data line 62b, and a second pattern 167_2, which extends in the horizontal direction and connects the first pattern 167_3 and the first contact hole 76a.

Coupling capacitors C1 and C2 are formed between the first subpixel electrode 82a and the first data line 62a, and a coupling capacitor C3 is formed between the first subpixel electrode 82a and the second data line 62b. Regions where the first subpixel electrode 82a is adjacent to the first data line 62a are relatively wider than a region where the first subpixel electrode 82a is adjacent to the second data line 62b. In addition, a storage wiring 28 is formed under the region where the first subpixel electrode 82a is adjacent to the second data line 62b and obstructs coupling. Hence, the coupling capacitance of the coupling capacitors C1 and C2 formed between the first subpixel electrode 82a and the first data line 62a is relatively greater than that of the coupling capacitor C3 formed between the first subpixel electrode 82a and the second data line 62b.

Therefore, the first pattern 167_3, which is arranged parallel to the second data line 62b, is formed in the second drain electrode connection portion 167b in order to complement the coupling capacitance between the first subpixel electrode 82a and the second data line 62b. The first pattern 167_3 forms a coupling capacitor Cb with the second data line 62b. This allows for the difference in capacitance between the coupling capacitors C1 and C2 of the first subpixel electrode 82a and the first data line 62a and the coupling capacitors C3 and Ca of the first subpixel electrode 82a and the second data line 62b to be reduced. The coupling capacitance of the coupling capacitor Cb may be adjusted by varying the length of the first pattern 167_3 and the distance between the first pattern 167_3 and the second data line 62b.

Hereinafter, display characteristics of LCDs according to embodiments of the present invention will be described with reference to FIG. 9.

Figure 9:
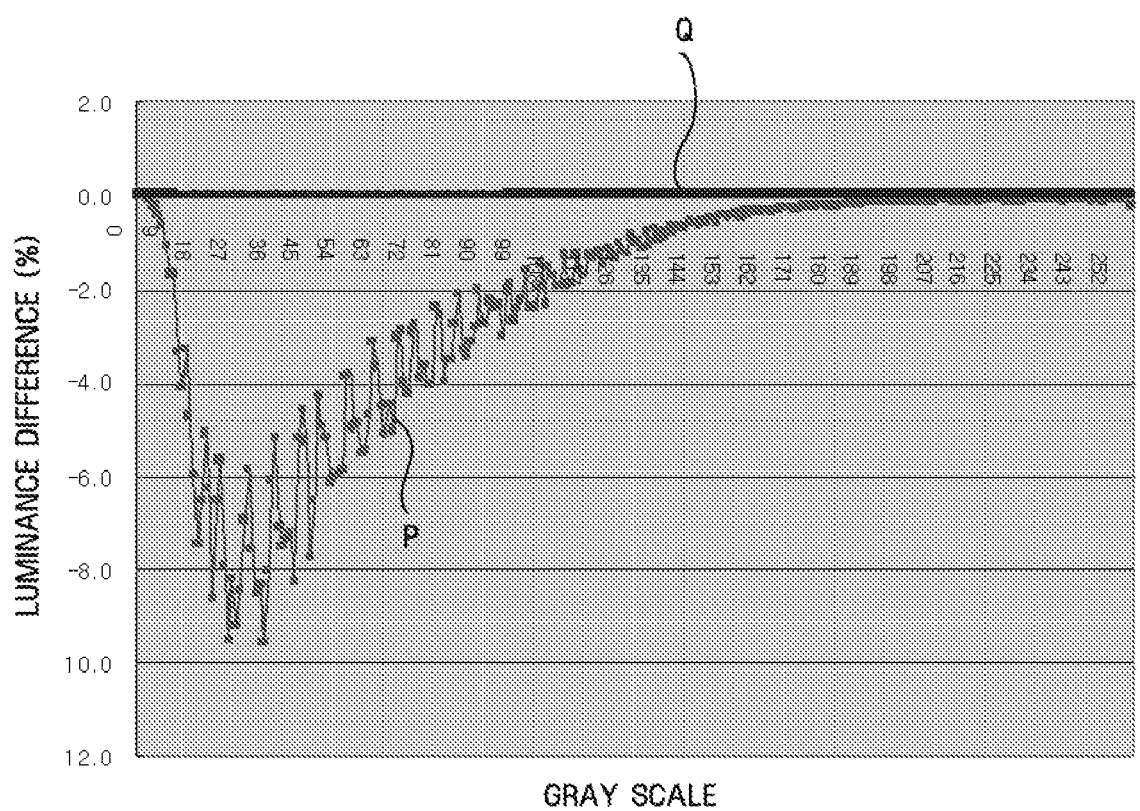
FIG. 9 is a graph showing the luminance differences between the type A pixels shown in FIG. 1 and FIG. 3 and the type B pixels shown in FIG. 1 and FIG. 7 at varying grayscales.

FIG. 9 is a graph showing luminance differences between the type A pixels shown in FIG. 1 and FIG. 3 and the type B pixels shown in FIG. 1 and FIG. 7 at varying grayscales. In the graph of FIG. 9, Q indicates luminance difference data when drain electrode connection portions, which together form a substantially rectangular band as discussed above, are used in the embodiments of the present invention. P indicates luminance difference data when the drain electrode connection portions are not used.

As shown in FIG. 9, the difference between the coupling capacitance of a subpixel electrode and one data line of the pair of data lines on the sides of the subpixel electrode and the coupling capacitance of the subpixel electrode and the other one of the data lines can be reduced using the drain electrode connection portions. Accordingly, the deterioration of the display quality of the LCDs due to crosstalk can be prevented and the luminance difference between the type A pixels and the type B pixels can be reduced. Consequently, LCDs according to exemplary embodiments of the present invention may maintain substantially uniform luminance on the whole.

In the exemplary embodiments of the present invention described above, when a V-shaped subpixel electrode is used, the difference between the coupling capacitances between the subpixel electrode and a pair of data lines adjacent to the subpixel electrode is reduced using drain electrode connection portions, which together form a substantially rectangular band. The difference between the coupling capacitances stems from the difference between the coupling areas of the subpixel electrode and the data lines, respectively. However, the present invention is not limited to a V-shaped subpixel electrode and can be applied to subpixel electrodes of various different shapes having different coupling areas with neighboring data lines.

As described above, an LCD according to the present invention applies different data voltages to a pair of subpixels that together form a pixel, thereby enhancing lateral visibility.

In addition, the LCD adjusts coupling capacitances between a subpixel electrode and data lines using drain electrode connection portions, which connect drain electrodes and pixel electrodes and which are arranged parallel to the data lines. Therefore, the LCD may prevent the deterioration of display quality due to crosstalk.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
   a first insulating substrate;
   a gate line disposed on the first insulating substrate and extending in a first direction;
   a first data line and a second data line insulated from and crossing the gate line, separated from each other, and extending in a second direction;
   a first thin film transistor (TFT) connected to the gate line and the first data line;
   a second TFT connected to the gate line and the second data line;
   a first subpixel electrode and a second subpixel electrode connected to the first TFT and the second TFT, respectively; and
   a first drain electrode connection portion and a second drain electrode connection portion electrically insulated from each other and connecting the first TFT and the second TFT, to the first subpixel electrode and the second subpixel electrode, respectively,
   wherein the first subpixel electrode is substantially V-shaped and disposed in a region of a pixel and the second subpixel electrode is disposed in the remaining region of the pixel,
   the first subpixel electrode is arranged such that the top portion of the "V" is adjacent to the first data line in two regions and the bottom portion of the "V" is adjacent to the second data line in one region, and
   a portion of the first drain electrode connection portion is arranged proximate and parallel to the second data line, forming a coupling capacitor between the proximate and parallel portion of the first drain electrode connection portion and the second data line.

2. The LCD of claim 1, wherein the first drain electrode connection portion comprises:
   a first pattern connecting the first TFT and the first subpixel electrode and extending in the second direction;
   a second pattern extending from the first pattern in the first direction; and
   a third pattern extending from the second pattern in the second direction and arranged parallel to the second data line.

3. The LCD of claim 1, further comprising:
   a second insulating substrate facing the first insulating substrate; and
   a common electrode disposed on the second insulating substrate.

4. The LCD of claim 1, wherein the second drain electrode connection portion extends in the first direction.

5. The LCD of claim 1, wherein the difference between a common voltage and a first data voltage applied to the first subpixel electrode is greater than the difference between the common voltage and a second data voltage applied to the second subpixel electrode.

6. The LCD of claim 1, further comprising a storage wiring overlapping the first subpixel electrode at the bottom portion of the "V" and extending in the first direction.

7. The LCD of claim 1, wherein the first drain electrode connection portion and the second drain electrode connection portion are formed of substantially the same materials and are on the same layer as the first data line and the second data line.

8. A liquid crystal display (LCD), comprising:
   a first insulating substrate;
   gate lines disposed on the first insulating substrate and extending in a first direction;
   first data lines and second data lines insulated from and crossing the gate lines, separated from each other, and extending in a second direction; and
   a plurality of pixels defined by the crossing of the gate lines and the data lines, a pixel comprising:
      a first thin film transistor (TFT) connected to a gate line and a first data line;
      a second TFT connected to the gate line and a second data line;
      a first subpixel electrode having a substantially V-shape in a region of the pixel, wherein the bottom portion of the "V" is adjacent to the second data line;
      a second subpixel electrode disposed in the remaining region of the pixel; and
      a drain electrode connection portion having a portion parallel to the first data line and the second data line and connecting the first TFT or second TFT to the first subpixel electrode or second subpixel electrode,
   wherein a first type of pixel comprises the first subpixel electrode connected to the first data line and a second type of pixel comprises the first subpixel electrode connected to the second data line, the first type of pixel and the second type of pixel being are alternately arranged in the first direction and the second direction.

9. The LCD of claim 8, wherein the drain electrode connection portion of the pixel of the first type of pixel comprises:
   a first drain electrode connection portion connecting the first TFT and the first subpixel electrode; and
   a second drain electrode connection portion connecting the second TFT and the second subpixel electrode,
   wherein a portion of the first drain electrode connection portion is arranged proximate and parallel to the second data line, forming a coupling capacitor between the proximate and parallel portion of the first drain electrode connection portion and the second data line.

10. The LCD of claim 9, wherein the first drain electrode connection portion comprises:
   a first pattern connecting the first TFT and the first subpixel electrode and extending in the second direction;
   a second pattern extending from the first pattern in the first direction; and a third pattern extending from the second pattern in the second direction and arranged parallel to the second data line.

11. The LCD of claim 10, further comprising:
a second insulating substrate facing the first insulating substrate; and
a common electrode disposed on the second insulating substrate.

12. The LCD of claim 8, wherein the drain electrode connection portion of the pixel of the second type of pixel comprises:
a first drain electrode connection portion connecting the first TFT and the second subpixel electrode; and
a second drain electrode connection portion connecting the second TFT and the first subpixel electrode,
wherein a portion of the second drain electrode connection portion is arranged proximate and parallel to the second data line, forming a coupling capacitor between the proximate and parallel portion of the second drain electrode connection portion and the second data line.

13. The LCD of claim 12, wherein the second drain electrode connection portion comprises:
a first pattern extending from the second TFT in the second direction and arranged parallel to the second data line;
a second pattern connecting the first pattern and the first subpixel electrode and extending in the first direction.

14. The LCD of claim 8, further comprising a storage wiring overlapping the first subpixel electrode at the bottom portion of the "V" and extending in the first direction.

15. The LCD of claim 8, wherein the difference between a common voltage and a first data voltage applied to the first subpixel electrode is greater than the difference between the common voltage and a second data voltage applied to the second subpixel electrode.

* * * * *